United States Patent [19]

Hergenrother et al.

[11] Patent Number: 4,663,483

[45] Date of Patent: May 5, 1987

[54] POLYENAMINES FROM AROMATIC DIACETYLENIC DIKETONES AND DIAMINES

[75] Inventors: Paul M. Hergenrother, Yorktown; Robert G. Bass, Richmond; Mark S. Sinsky, Richmond; John W. Connell, Richmond, all of Va.

[73] Assignee: The United States of America as represented by the Administrator of the National Aeronautics and Space Administration, Washington, D.C.

[21] Appl. No.: 734,366

[22] Filed: May 15, 1985

[51] Int. Cl.[4] .................. C07C 85/02; C07C 85/18
[52] U.S. Cl. .................... 564/396; 564/330; 564/430; 546/262; 546/264; 528/229
[58] Field of Search .............. 564/330, 396, 430; 528/229; 546/262, 264

[56] References Cited

U.S. PATENT DOCUMENTS 3,242,215  3/1966  Heitmiller ..................... 528/229
3,637,602  1/1972  Coniciatori ................... 528/229
4,321,198  3/1982  D'Alelio et al. ............... 528/229

OTHER PUBLICATIONS

Sidgwick, N. V. "The Organic Chemistry of Nitrogen", Clarenndan Press, Oxford (1966) pp. 132–134.
Wagner, R. B. & Zook, H. D. "Synthetic Organic Chemistry" John Wiley & Sons, New York, (1953) pp. 672–673.

Primary Examiner—Charles F. Warren
Assistant Examiner—John A. Sopp
Attorney, Agent, or Firm—George F. Helfrich; Wallace J. Nelson; John R. Manning

[57] ABSTRACT

The synthesis and characterization of several polyenamine ketones are discussed wherein conjugated diacetylenic diketones and aromatic diamines are used as a route to the formation of high molecular weight polyenamine ketones which exhibit good mechanical properties and can be cast into creasible films. Typical polymerization conditions involved the reaction of stoichiometric amounts of 1,4- or 1,3-PPPO and a diamine at 60°–130° C. in m-cresol at (w/w) solids content of 8–26% for a specified period of time under a nitrogen atmosphere. Novel polyenamine ketones were prepared with inherent viscosities as high as 1.99 dl/g and tough, clear amber films with tensile strengths of 12,400 psi and tensile moduli of 397,000 psi were cast from solutions of the polymers in chloroform. The polymers exhibited $T_g$s as high as 235° C. and weight losses of 14% after aging at 232° C. in circulating air for sixty hours. The specific conditions for the preparation of the various polyenamine ketones are presented in Table I. In most cases, the elemental analyses for the polynamine ketones, shown in Table II, agree within ±0.3% of the theoretical values.

10 Claims, No Drawings

POLYENAMINES FROM AROMATIC DIACETYLENIC DIKETONES AND DIAMINES

ORIGIN OF THE INVENTION

The invention described herein was made jointly in the performance of work under NASA Grant NSG 1-239 with Virginia Commonwealth University employees and an employee of the U.S. Government. In accordance with 35 USC 202, the contractor elected not to retain title.

FIELD OF INVENTION

This invention relates to novel polyenamine ketones and a process for preparing same to yield polymers having different chemical structures and improved physical properties over those previously prepared.

BACKGROUND OF THE INVENTION

As part of an effort on high performance/high temperature polymers for functional and aerospace structural applications, the reaction of aromatic diacetylenic diketones with various monomers is under investigation.

There are several reports in the literature on the preparation of polyenamine ketones. Ueda and co workers prepared polyenamine ketones from the reaction of diamines with 1,6-diethoxy-1,5-hexadiene-3,4-dione [M. Ueda, K. Otaira and Y. Imai, *J. Polym. Sci. Polym. Chem. Ed.* 16, 2809 (1978)] and 2,2'-disubstituted bis(4-ethoxymethylene-5-oxazolone [M. Ueda, K. Kino, T. Hirono and Y. Imai, *J. Polym. Sci. Polym. Chem. Ed.* 14, 931 (1976)]. These low molecular weight polyenamine ketones exhibited initial onset of weight loss by thermogravimetric analysis (TGA) in a nitrogen atmosphere at 200°-300° C. Pavlisko and co workers reported the preparation of polyenamine ketones for the reaction of bis(1,3-diones) and diamines [J. A. Pavlisko, S. J. Huang, and B. C. Benicewicz, *J. Polym. Sci. Polym. Chem. Ed.* 20, 3079 (1982)]. These polymers were prepared in N-methylpyrrolidone using an acid catalyst with inherent viscosities in the range of 0.25-0.36 dL/g. Polyenamine ketones are not at present commercially available.

Poly(enamine-esters) comprise a second type of polymer containing the enaminocarbonyl system. The preparation and characterization of a number of such systems including some containing siloxane units has been reported by Moore and co-workers. [J. A. Moore and J. E. Kochanowski *Macromolecules* 8, 121 (2975); J. A. Moore and T. O. Mitchell *J. Polym. Sci. Polym. Chem. Ed.* 18, 3029 (1980) and 21, 1305 (1983)].

It is therefore an object of the present invention to provide novel polyenamine ketones having improved physical property characteristics.

Another object of the present invention is to provide high molecular weight polyenamine ketones that can be solution cast to form films having improved mechanical properties.

A further object of the present invention is a process for preparing high molecular weight polyenamine ketones.

Another subject of the present invention is a process for preparing solution of polyenamine ketones that can be directly used to prepare prepregs, adhesive tapes, film and coatings.

BRIEF DESCRIPTION OF THE INVENTION

According to the present invention, the foregoing and additional objects are attained by employing a novel process to achieve novel soluble high molecular weight polyenamine ketones. These polyenamine ketones have glass transition temperatures and thermal stabilities much higher than those previously prepared. In addition, the polyenamine ketones of this invention can be solution cast to form films having high mechanical properties. No mechanical properties have been reported on previous polyenamine ketone films presumably due to the low molecular weights which prohibited film formation.

Polyenamine ketones of this invention are readily prepared from the reaction of aromatic diacetylenic diketones and diamines as depicted in the following equation:

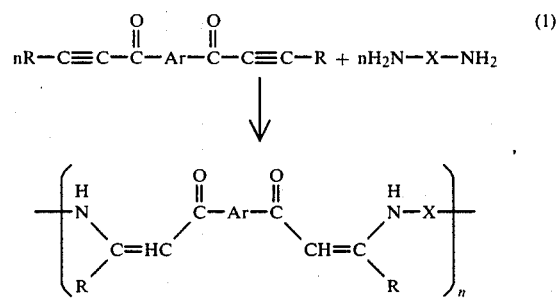

where
$n = 10\text{-}500$
$R = H$ or $C_6H_5$
$Ar = $ aromatic such as

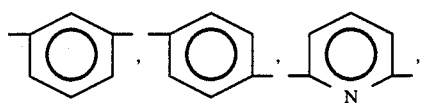

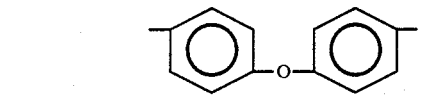

$X = $ aromatic such as

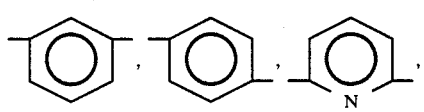

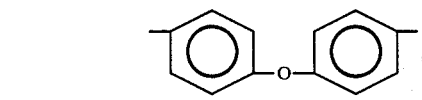

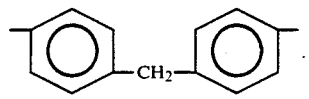

or aliphatic such as —C$_4$H$_8$—, —C$_5$H$_{10}$—, —C$_6$H$_{12}$—, etc.

The polymerization is generally conducted by reacting stoichiometric quantities of the two monomers in a stirred solution at 60°–130° C. for several hours. Although m-cresol is the solvent of choice, other solvents such as N,N-dimethylacetamide, dimethylsulfoxide, and chlorinated solvents such as sym-tetrachloroethane can be used. In some cases, the stoichiometry can be imbalanced, preferably by using a slight excess (1 to 3 mole %) of the aromatic diacetylenic diketone, to avoid extremely high molecular weight polymer. If the molecular weight of the polymer is too high the result is extremely viscous solutions and in some cases, gelation. The as-prepared solutions of polyenamine ketones can be used direcly to prepare prepregs, adhesive tapes, films or coatings. The solvent is subsequently removed, generally by heating, to leave the polyenamine ketones on the substrate.

Polyenamine ketones of a different chemical structure may be prepared by using different aromatic diacetylenic diketones as indicated on the following equation:

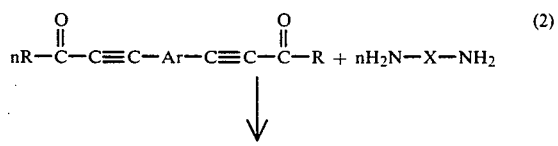

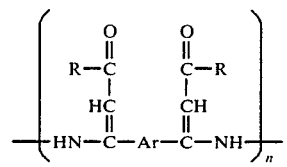

where n, R, Ar and X are the same as discussed hereinbefore in reference to the first equation.

The polymers in the latter equation have a major portion of the mer unit as pendent groups whereas those in the first equation have these groups within the polymer backbone.

Also, substituted amines (secondary amines, RHN—X—NHR) can be used in place of the unsubstituted diamines (primary amines, H$_2$N—X—NH$_2$). The R group would be alkyl (e.g. CH$_3$, C$_2$H$_5$, etc). The resulting polymers would have different properties than those in the first equation since the polymers from the substituted amines could not engage in hydrogen bonding to form a 6-membered ring. In addition, other nucleophiles may add across the activated acetylene to yield other classes of polymers, as example, synthesis of polymers from the reaction of aromatic diacetylenic diketones and dimercaptans (dithio compounds).

A more complete appreciation of the invention and the specific process involved will be more clearly apparent from the following Tables and specific Examples illustrating the addition polymerization of two diacetylenic diketones, 1,1'(1,3-phenylene)bis(3-phenyl-2-propyn-1-one) (1,3-PPPO) and 1,1'-(1,4-phenylene)-bis(3-phenyl-2-propyn-1-one) (1,4-PPPO), with various aromatic diamines as a facile route to novel polyenamine ketones.

The synthesis and characterization of these polyenamine ketones is set forth in Table I.

TABLE I

Synthesis and Characterization of Polyenamine Ketones

| Polymer | Monomer PPPO | Diamine | Reaction Time$^a$, h | Conc., Solids (w/w) | Reaction Temp., °C. | $\eta_{inh}^b$, dl/g | GPC Retention Time$^c$, Min |
|---|---|---|---|---|---|---|---|
| I | 1,4 | PDA | 4 | 8 | 100 | Insol. | Insol. |
| II | 1,4 | MPDA | 6 | 13 | 130 | 0.65 | 37.5 |
| III | 1,3 | MDA | 7 | 13 | 100 | 1.09 | 36.6 |
| IV | 1,4 | MDA | 4.5 | 13 | 100 | 1.26 | 35.2 |
| V | 1,3 | ODA | 5.75 | 13 | 100 | 1.29 | 36.4 |
| VI | 1,4 | ODA | 3.75 | 13 | 100 | 1.99 | 35.0 |
| VII | 1,3 | MSDA | 43 | 26 | 125 | 0.64 | 35.8 |
| VIII | 1,4 | MXDA | 7 | 15 | 60 | 0.34 | Insol. |
| IX | 1,3 | MXDA | 3.75 | 15 | 60 | 0.22 | Insol. |

$^a$m-Cresol as solvent.
$^b$CHCl$_3$ solvent, except for use of m-cresol for polymers from 1,3-xylylenediamine,-0.5% g/dl concentration(w/v).
$^c$CHCl$_3$ solvent, ultra-styragel (10$^6$, 10$^5$, 10$^4$, 10$^3$ Å).

The Elemental Analyses, NMR Spectral Data and Thermal Characterization for Polymers I–IX of Table I are set forth, respectively, in Tables II, III, and IV.

TABLE II

Elemental Analyses of Polyenamine Ketones

| Polymer | Monomer PPPO | Diamine | Formula | Elemental Analysis$^a$ (%) C | H | N |
|---|---|---|---|---|---|---|
| I | 1,4 | PDA | C$_{30}$H$_{22}$N$_2$O$_2$ | 81.17 (81.43) | 5.24 (5.01) | 6.05 (6.33) |
| II | 1,4 | MPDA | C$_{30}$H$_{22}$N$_2$O$_2$ | 79.02 (81.43) | 5.07 (5.01) | 6.28 (6.33) |
| III | 1,3 | MDA | C$_{37}$H$_{28}$N$_2$O$_2$ | 83.41 (83.43) | 5.44 (5.30) | 5.17 (5.26) |
| IV | 1,4 | MDA | C$_{37}$H$_{28}$N$_2$O$_2$ | 82.61 | 5.50 | 5.22 |

TABLE II-continued
Elemental Analyses of Polyenamine Ketones

| Polymer | Monomer PPPO | Monomer Diamine | Formula | Elemental Analysis[a] (%) C | H | N |
|---|---|---|---|---|---|---|
| | | | | (83.43) | (5.30) | (5.26) |
| V | 1,3 | ODA | $C_{36}H_{26}N_2O_3$ | 80.59 | 4.75 | 5.15 |
| | | | | (80.88) | (4.90) | (5.24) |
| VI | 1,4 | ODA | $C_{36}H_{26}N_2O_3$ | 80.62 | 5.05 | 5.12 |
| | | | | (80.88) | (4.90) | (5.24) |
| VII | 1,3 | MSDA | $C_{36}H_{26}N_2O_4S$[b] | 73.96 | 4.68 | 4.57 |
| | | | | (74.21) | (4.50) | (4.81) |
| VIII | 1,4 | MXDA | $C_{32}H_{26}N_2O_2$ | 80.38 | 5.60 | 5.63 |
| | | | | (81.68) | (5.57) | (5.95) |
| IX | 1,3 | MXDA | $C_{32}H_{26}N_2O_2$ | 81.19 | 5.58 | 5.82 |
| | | | | (81.68) | (5.57) | (5.95) |

[a]Theoretical values in parentheses.
[b]S:found, 5.41%; calcd., 5.60%.

TABLE 3
NMR Spectral Data For Polyenamine Ketones

| Polymer | Monomer PPPO | Monomer Diamine | $^{13}C$ $C^1$ | $C^{2c}$ | $C^3$ | $^1H$ $H(C^2)$ | $H(N)$ |
|---|---|---|---|---|---|---|---|
| II | 1,4 | MPDA | 188.9 | 97.5 | 161.7 | 6.09 | 12.72 |
| III | 1,3 | MDA[b] | 188.9 | 96.8 | 161.9 | 6.11 | 12.92 |
| IV | 1,4 | MDA[b] | 188.6 | 97.1 | 161.9 | 6.08 | 12.96 |
| V | 1,3 | ODA | 188.9 | 96.7 | 162.1 | 6.14 | 12.93 |
| VI | 1,4 | ODA | 188.6 | 96.9 | 162.1 | 6.10 | 12.98 |
| VII | 1,3 | MSDA | 189.5 | 98.5 | 160.9 | 6.23 | 12.90 |
| VIII | 1,3 | MXDA[d] | 188.3 | 94.2 | 167.1 | 5.86 | 11.68 |
| IX | 1,4 | MXDA[d] | 188.0 | 94.4 | 167.1 | 5.83 | 11.73 |

[a]All spectra were obtained in $CHCl_3$ and are reported in ppm.
[b]Methylene carbon appears near 40.5 ppm as triplet in SFOR spectrum.
[c]C-2 appears as doublet in SFOR spectrum.
[d]Methylene carbon near 48.4 ppm as triplet in SFOR spectrum.

TABLE 4
Thermal Characterization of Polyenamine Ketones

| Polymer | Monomer PPPO | Monomer Diamine | Tg, °C DSC[a] | Tg, °C TBA[b] | TGA Polymer Decomp. Temp., °C Air | TGA Polymer Decomp. Temp., °C Nitrogen |
|---|---|---|---|---|---|---|
| I | 1,4 | PDA | 235 | — | 300 | 380 |
| II | 1,4 | MPDA | 218 | — | 300 | 390 |
| III | 1,3 | MDA[c] | 198 | 202(204) | 300 | 390 |
| IV | 1,4 | MDA[c] | 209 | 210(220) | 295 | 385 |
| V | 1,3 | ODA | 211 | — | 305 | 390 |
| VI | 1,4 | ODA | 218 | 217(222) | 300 | 390 |
| VII | 1,3 | MSDA | 202 | 203(207) | 295 | 360 |

[a]After heating to 275° C. in static air.
[b]Values in parentheses were obtained after heating to 350° C. in nitrogen.
[c]Weight loss is 14% after 60 h at 232° C.

1,1'-(1,4-Phenylene)bis(3-phenyl-2-propyn-1-one) 1,4-PPPO

A solution of lithium phenylacetylide (0.41 mol) was prepared in THF (200 ml) as described above. Terephthalaldehyde (25.0 g, 0.186 mol, Aldrich Chemical Company) in THF (150 ml) was added dropwise over ten minutes to the phenylacetylide solution while maintaining the temperature below 5° C. The reaction slurry was treated with additional THF (200 ml) and then allowed to warm to room temperature over forty-five minutes. The reaction mixture was neutralized with 20% aqueous sulfuric acid (100 ml) and the organic layer was washed twice with water (200 ml) and the solvent removed in vacuo (<50° C.) to yield an oil. A solution of the oil in acetone (200 ml) was then treated dropwise over fifteen minutes with chromic anhydride (26.0 g, 0.26 mol) in sulfuric acid (22.4 ml) and water (75.0 ml) while maintaining the temperature below 20° C. The solution was then allowed to warm to room temperature while stirring was maintained for thirty minutes. The reaction mixture was poured onto cracked ice (750 g) to isolate the crude product. After filtration and air drying, the 1,4-PPPO was dissolved in a minimal amount of hot chloroform and the solution was filtered through a 5 cm bed of silica gel (mesh size 60-220, Davidson Chemical Corporation) to remove chromium salts. Removal of the solvent in vacuo provided the product. Recrystallization twice from methyl ethyl ketone gave pale yellow needles of pure 1,4-PPPO: yield 32.7 g (52.6%); mp 192.5°-193.5° C. (lit mp 185°-187° C.).

1,1'-(1,3-Phenylene)bis(3-phenyl-2-propyn-1-one) 1,3-PPPO

Crude 1,3-PPPO from isophthalaldehyde (25.0 g, 0.186 mole, Sigma Chemical Company) was obtained using the procedure described for the preparation of 1,4-PPPO. Recrystallization of the crude product from 2-propanol/95% ethanol gave cream colored crystals of pure 1,3-PPPO: yield 28.5 g (47.7%); mp 119°-121° C. IR(KBr) 2212 $cm^{-1}$ (C≡C), 1702 $cm^{-1}$ (C=O); $^1H$ NMR δ9.13-7.24 (14H, m, Ar—H); $^{13}C$ NMR 176.7 ppm (C=O), 94.2 ppm (≡C-CO), 86.7 ppm (≡C-Ph) Anal. Calcd. for $C_{24}H_{14}O_2$: C, 86.21%; H, 4.22% Found: C, 86.08%; H, 4.27%.

Diamines and Reagents 4,4'-Oxydianiline (ODA), 4,4'-methylenedianiline (MDA), and 3,3'-sulfonyldianiline (MSDA), obtained from Aldrich Chemical Company, were purified by recrystallization from THF, benzene, and 95% ethanol, respectively. 1,3-Xylylenediamine (MXDA) and m-cresol (97% pure) provided by Aldrich Chemical Company, were used as received. 1,3-Phenylenediamine (MPDA), 1,4-phenylenediamine (PDA) and other required reagents were obtained commercially and used without further purification.

Polymerizarion Example

Polymerization and film making of all the polyenamine ketones discussed herein were conducted by essentially the same procedure and the details of all are omitted in the interest of brevity with one representative sample being given for the polymerization and one for the film making.

A typical example of polymerization is the synthesis of polyenamine ketone VI (Table I) from ODA and 1,4-PPPO. To a solution of 1,4-PPPO (2.5000 g, 7.476 mmol) in m-cresol (26.7 g) was added ODA (1.497 g, 7.476 mmol). The solution was stirred at 100° C. for three and three-fourth hours under a nitrogen atmosphere. The solution color changed from yellow to dark red as the polymerization proceeded. The highly viscous solution was poured into methanol (200 ml) in a high speed blender to precipitate the polyenamine keytone (V1). The polymer was collected by filtration, washed repeatedly with methanol, and dried at 90° C. The yield of V1 was 3.922 g (98%). The inherent viscosity, $\eta_{inh}$, at 25° C. of the resultant polymer in chloroform was 1.99 dl/g, measured at a concentration of 0.5% (w/v). IR(KBr) 1593 cm$^{-1}$ (C=O), 1609, 1568, 1497, 1478, 1445 cm$^{-1}$ (C=C); 1209 cm$^{-1}$ (C-O); $^1$H NMR $\delta$12.97 (2H, s, N—H); $\delta$8.01–6.74 (22H, m, Ar—H) $\delta$6.10 (2H, s, vinyl H); $^{13}$C NMR 188.9 ppm (C=O), 161.9 ppm (—$\underline{C}$=CH—CO), 96.8 ppm (=$\underline{C}$-CO).

Films

A chloroform solution (10% solids, w/v) of polymer V, Table I, was centrifuged and subsequently cast using a doctored blade onto plate glass. The wet film was dried to a tack-free state in a dust proof chamber. The film on glass was further dried to 200° C. in air. The film was removed from the glass and mechanical tests were performed according to ASTM D882.

Characterization

Differential scanning calorimetry (DSC) was performed in static air or a nitrogen atmosphere at a heating rate of 20° C./min using a DuPont Model 990 thermal analyzer in combination with a standard DSC cell. The apparent glass transition temperature (Tg) was taken at the inflection point of the $\Delta$T versus temperature curve. Torsional braid analyses (TBAs) were performed using an eight-inch glass braid at a heating rate of 3° C./min over the temperature range from −120° C. to 350° C. Heat-up and cool-down curves were obtained on the same samples with the Tg taken at the maximum of the damping peak on the heat-up and cool-down curves. Thermogravimetric analyses (TGAs) were performed on powdered samples using a Perkin-Elmer program temperature controller model UV-1 in combination with a heater controller and an autobalance model AR-2 at a heating rate of 2.5° C./min in nitrogen. Gel permeation chromatography (size exclusion) (GPC) was performed in chloroform using an ultra-Styragel column bank (10$^6$, 10$^5$, 10$^4$, 10$^3$ Å). Inherent viscosities were obtained on a 0.5% (w/v) solution in chloroform at 25° C. Infrared (IR) spectra were obtained on a Perkin-Elment 283 spectrophotometer as films or KBr discs. Proton and carbon magnetic resonance ($^1$H and $^{13}$C-NMR) spectra were obtained in CDCl$_3$ on a JOEL FX90Q Fourier transform NMR spectrometer. Chemical shifts are reported in parts per million ($\delta$) downfield from internal tetramethylsilane (TMS). All melting points were determined on a Thomas Hoover melting point apparatus and are uncorrected. Elemental analyses were performed by either Atlantic Microlabs, Inc., Atlanta, Ga. or Galbraith Laboraties, Inc., Knoxville, Tenn. and were within ±0.3% of theoretical values for the model compounds.

Polymerization Summary

The Michael-type addition of amines to activated acetylene is known to proceed smoothly and in high yield to give enamines. The present invention is concerned in the use of conjugated diacetylenic diketones and aromatic diamines as a route to the formation of high molecular weight polyenamine ketones which exhibit good mechanical properties and can be cast into creasible films. Typical polymerization conditions involved the reaction of stoichiometric amounts of 1,4- or 1,3-PPPO and a diamine at 60°–130° C. in m-cresol at (w/w) solids content of 8–26% for a specified period of time under a nitrogen atmosphere. The specific conditions for the preparation of the various polyenamine ketones are presented in Table I. In most cases, the elemental analyses for the polyenamine ketones, shown in Table II, agree within ±0.3% of the theoretical values.

Gel permeation (size-exclusion) chromatography for all the soluble polymers gave smooth Gaussian distributions, except for the 1.3-PPPO/MDA polymer. The GPC curve for this polymer had a major peak at 36.6 minutes and shoulders at 28.8, 31.8, and 41.8. The GPC peak retention times reported in Table I for the various polyenamine ketones compare well with the $\eta_{inh}$ viscosity data (lower viscosity, longer retention time).

The rate of polymerization of ODA with 1,4-PPPO, in terms of inherent viscosity of the resulting polymer, when employing stoichiometric quantities of starting materials at 13% solids (w/w) in m-cresol at 100° C., indicated that $\eta_{inh}$ increased steadily over time until gelation occurs.

The polymerization of aromatic diacetylenic diketones with either ODA or MDA in m-cresol gave homogeneous, viscous reaction mixtures from which high polymers were obtained. Freshly prepared polymers from MXDA were found to exhibit lower viscosities in the range from 0.22 to 0.38 dl/g in m-cresol (0.5% w/v). The polymers from MXDA were also insoluble in chloroform and exhibited poor stability as evidenced by the decrease in the inherent viscosities for samples heated at 90° C. in air for five to seven days.

The DSC curves for the polyenamine ketones I–IX gave well defined second-order transitions in the range from 198° to 235° C. The apparent Tgs are reported in Table IV. In comparing the two polyenamine ketones from 4,4'-oxydianiline, the Tg was lower for the more flexible 1,3-isomer.

The TBA curves for the polyenamine ketones gave Tgs which compared favorably with those determined by DSC. After heating samples to 350° C. in the TBA, the cool-down curves for the same samples exhibited an increase in the Tg values (presumably due to cross-linking) as indicated in Table IV. All of the soluble polyenamine ketones exhibited a strong $\beta$-transition in the range from −78° to −92° C.

Thermogravimetric analyses for the polyenamine ketones were performed in both nitrogen and flowing air. TGA showed a two-stage breakdown with polyenamine ketones decomposition temperatures in nitrogen and air of approximately 390° C. and 300° C., respectively.

Thin films of two polyenamine ketones, 1,3-PPPO/ODA(V) and 1,4-PPPO/MPDA(II), were aged at 232° C. in circulating air. After eighteen hours, the films embrittled, turned darker and exhibited a weight loss of 5%. After a total of sixty hours at 232° C., weight losses of 14% were recorded. The polyenamine ketone film from 1,4-PPPo and 1,3-phenylenediamine exhibited a Tg of 238° C. (initial 218° C.) after aging for sixty hours at 232° C.

Thin film properties representative of the polyenamine ketones were obtained for the polymer from 1,4-PPPO/ODA(VI). The film exhibited the following properties: tensile strength, 12,400 psi at 26° C. and 9,110 psi at 93° C.; tensile modulus, 397,000 psi at 26° C. and 329,000 psi at 93° C.; and elongation to break approximately 4% at both temperatures.

Thus, according to the present invention, high molecular weight polyenamine ketones may be readily prepared from the solution polyaddition of the activated bisacetylene, 1,3- and 1,4-PPPO with various diamines. Although the invention has been described relative to specific exemplary Example, it is to be understood that these Examples are merely to illustrate the present invention and are not intended, or to be interpreted, as exhaustive.

Thus, various modifications and variations of the present invention will be apparent to those skilled in the art in the light of the above teachings. It is therefore to be understood that, within the scope of the appended claims, the invention may be practiced otherwise than as specifically described.

What is claimed as new and desired to be secured by Letters Patent of the United States is:

1. A method of preparing a high molecular weight of polyenamine ketone comprising the steps of:
combining a diacetylenic diketone with an aromatic diamine in a stirred solvent solution at 60°–130° C. for several hours under a nitrogen atmosphere to yield a polyenamine ketone solution adaptable for preparing prepregs, adhesive tapes, films and coatings by applying the solution to the desired substrate and heating to remove the solvent to yield the high molecular weight polyenamine ketone on the substrate.

2. The method of claim 1 wherein the diacetylenic diketone is selected from the group consisting of:
1,1'-(1,3-phenylene)bis(3-phenyl-2-propyn-1-one) (1,3-PPPO) and
1,1'-(1,4-phenylene)bis(3-phenyl-2-propyn-1-one) (1,4-PPPO).

3. The method of claim 1 wherein the aromatic diamine is selected from the group consisting of:
1,4-phenylenediamine (PDA)
1,3-phenylenediamine (MPDA)
4,4'-methylenedianiline (MDA)
4,4'-oxydianiline (ODA)
3,3'-sulfonyldianiline (MSDA), and
1,3-xylylenediamine (MXDA).

4. The method of claim 1 wherein the polyenamine ketone solution obtained has a solids concentration in the range of 8–26% w/w.

5. The method of claim 1 wherein the solvent solution is selected from the group of solvents consisting of:
m-cresol,
N,N-dimethylacetamide,
dimethylsulfoxide, and
sym-tetrachloroethane.

6. The method of claim 1 wherein the reaction time is in the range of 3.75–43 hours.

7. The method of claim 1 wherein stoichiometric quantities of the diacetylenic diketone and the aromatic diamine are employed in the reaction.

8. The method of claim 1 wherein the stoichiometry of the diacetylenic diketone and the aromatic diamine is imbalanced to control the molecular weight and thus the viscosity of the polyenamine ketone solution obtained.

9. The method of claim 8 wherein an excess of 1–3 mole% of the aromatic diacetylenic diketone is employed in the reaction.

10. The method of claim 1 wherein the solvent solution is m-cresol.

* * * * *